INVENTOR
MANFRED BOHNER

BY [signature]
ATTORNEY

Dec. 1, 1970 M. BOHNER 3,544,977

ASSOCIATIVE MEMORY MATRIX USING SERIES CONNECTED DIODES HAVING VARIABLE RESISTANCE VALUES

Filed Oct. 29, 1968 2 Sheets-Sheet 2

INVENTOR

MANFRED BOHNER

BY Menotti J. Lombardi

ATTORNEY

United States Patent Office 3,544,977
Patented Dec. 1, 1970

3,544,977

ASSOCIATIVE MEMORY MATRIX USING SERIES CONNECTED DIODES HAVING VARIABLE RESISTANCE VALUES

Manfred Bohner, Stuttgart-Zuffenhausen, Germany, assignor to International Standard Electric Corporation, New York, N.Y., a corporation of Delaware Filed Oct. 29, 1968, Ser. No. 771,520
Claims priority, application Germany, Dec. 22, 1967, 1,549,076
Int. Cl. G11c *11/36*
U.S. Cl. 340—173 2 Claims

ABSTRACT OF THE DISCLOSURE

The arrangement utilizes as a storage or memory element solid-state devices which can be in a high- or low-resistive state, so that when applying a voltage to the device exceeding a threshold value, the device is rendered low-resistive, and the device is rendered high-resistive as soon as a current exceeding the threshold value flows through the device.

BACKGROUND OF THE INVENTION

The present invention relates to a matrix-shaped associative memory system employing contradictory storing.

Associative memories are also known as content-addressed memory systems. These terms refer to digital or analogue information storages in which the access to the storage cells is effected by the information stored therein, and not, as in normal types of storages, by stating the local position of the individual cells.

The conventional associative memories utilize semiconductor components( transistors, tunnel diodes), superconductive components, and magnetic components. Each of these components have disadvantages with respect to associative memories having large storage capacities which are of major interest. A memory comprising semiconductor components continuously consumes power and is expensive to manufacture. Memories employing superconducting components require expensive circuits, a cryostat used for the operation, and the inherent problem of keeping the temperature constant and the heat dissipated are disadvantageous. In addition the components in the superconducting state are very low-resistive, so that connections between different substrates become a problem. In magnetic component memories, the small signal-to-noise ratio of the signals and the problem of resolving multiple reactions is considered disadvantageous. The present invention avoids the disadvantages of the conventional types of associative memories.

This is accomplished in that as a storage or memory element there are used the solid-state devices which according to the U.S. Pat. No. 3,440,588, either have a high-resistive or a low-resistive state. When applying a voltage to the device, exceeding a threshold value, the device is rendered low-resistive, and is rendered high-resistive as soon as a current exceeding a certain threshold value is caused to flow through the device.

SUMMARY OF THE INVENTION

The invention is characterized by the fact that each intersecting point consists of the series connection of a diode with a storing solid-state device, that for each row there is provided one resistor, and that under the condition that the high-resistive state of the solid-state device is associated with the binary 1 the storage or memory is operated as follows:

(a) Erasing of a row: application of a high negative voltage via a controllable connection in the row control, and fixed connections in the column controls;

(b) Writing into a row: application of a current via a controllable connection in the row control, and connections controlled by the information to be written-in, in the column controls;

(c) Interrogating: application of positive potential via connections controlled by the interrogation word, in the column controls, in which case at the resistor, in the event of a complete agreement between the interrogation word and the stored word in one row, a low and, in the case of at least one non-coincidence in one bit position, there will appear a voltage which is high in comparison with the first voltage; and (d) Reading out of one row: application of negative potential via a controllable connection in the row control and noncontrollable connections in the column controls, in which case the result storage is marked by the voltages corresponding to the stored values.

BRIEF DESCRIPTION OF THE DRAWINGS

The invention will now be explained in detail by way of example with reference to the accompanying drawings in which.

DESCRIPTION OF PREFERRED EMBODIMENT

Figure 1:
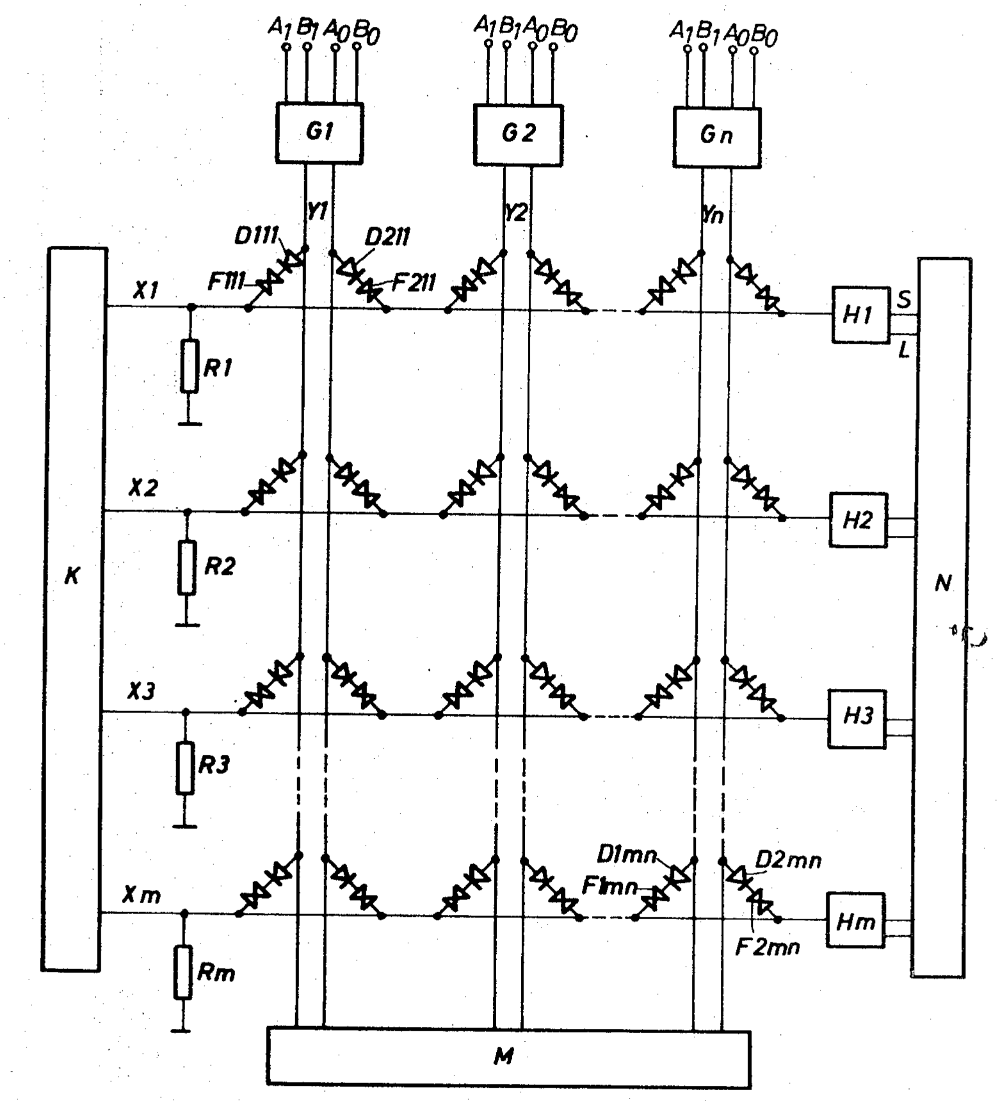
FIG. 1 shows an associative memory comprising *m* rows and *n* columns.

Referring to FIG. 1, there is shown an associative memory comprising *m* rows X1 . . . X*m* and *n* columns Y1 . . . Y*n*. The columns each time consist of two column wires which are not designated individually. Accordingly, at the intersecting point between a row and a column there will each time result two crosspoints. The double column leads serve the feeding-in of each binary value not only in a single, but in a contradictory manner. In cases where a 1 is to be marked at the crosspoint, the left-hand storage element with a 1, and the right-hand storage element is marked by 0. In the case of a storing of a 0, the left-hand storage element is marked with a 0, and the right-hand storage element is marked with a 1. Each crosspoint consists of the series connection of a diode D1*mn* or D2*mn* and a solid-state device F1*mn* or F2*mn* respectively. The control means associated with the memory are column controls G1 . . . G*n*, and row controls H1 . . . H*m*. Each column control consists of two equal parts which are explained in detail hereinafter in reference to FIG. 2. Each column control comprises four inputs, one interrogation input A0 or A1 for the binary 0 or the binary 1, as well as two writing inputs B0 or B1 respectively. To the interrogation inputs or writing inputs, when performing the interrogation or writing-in, there are applied each time the necesary binary values 0 or 1 respectively. FIG. 1 further includes a recognition and decoding circuit K which, per row, contains a threshold circuit responsive to a certain voltage value, and which is capable of storing the appearance of the threshold value. The decoding is also effected in this circuit. This circuit will also feed out sequentially, in the case of multiple coincidences, the coincidences appearing in parallel.

The row controls are provided with a circuit N acting as the address register, i.e. as address decoder. At the other end of the column leads there is the result storage M into which, during the reading of the information of a row, there are stored the results. The units KN and M are standard types which are used in connection with associative memories.

Figure 2:
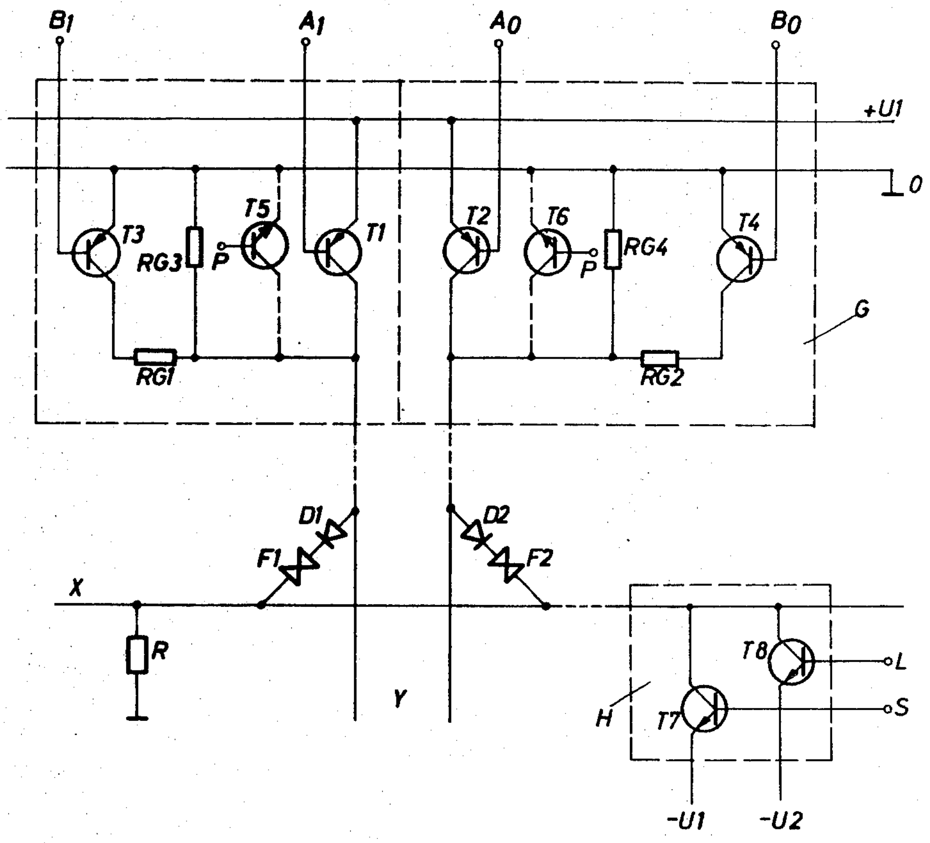
FIG. 2 shows a double crosspoint in connection with the column control and the row control.

In FIG. 2 there is illustrated a random double crosspoint which contains the two series connections of diode and solid-state device D1/F1 or D2/F2 respectively. Both the column contact G and the row control H contain different resistors and transistors functioning as hereinafter defined.

For explaining the circuit operation, the following arbitrary conditions are used:

solid-state device high-resistive corresponds to binary 1, and solid-state device low-resistive corresponds to binary 0.

If in one row there is written a word into the storage, it is appropriate to erase this row completely, so that all storage elements of this row are brought into the low-resistive condition or state.

To accomplish this, the transistor T8 in the row control H is controlled at its base which is connected to the terminal L, so that a high negative voltage —U2 is applied to the row lead. For the sake of simplification in the following description, one-half of the column control G is considered. Upon controlling the terminal S, the erase current will flow via ground, RG3, D1, F1 and T8, and all elements of one word are switched into the low-resistive state. The resistor RG limits the current after the switching over into the low-resistive state. It should be noted that no switch is actuated in the column control for effecting the erase. For writing-in, it is necessary to control the transistor T7 in the row control via its base which is connected to the terminal S, and to control one of the two transistors T3 or T4 depending on whether a binary 1 or a binary 0 is to be written-in. The solid-state device, according to the assumed conditions, is brought from a low-resistive into a high-resistive state. This requires a current above the threshold value, this current flows via ground T3, RG1, D1, F1, T7.

In the actual operation of the associative memory, during the interrogation of the storage, now control H is not required for the purpose of determining whether an offered word is in agreement or coincides with one or more words stored in the storage. By the bit of the compare words, the transistor T1 or T2 is driven into saturation and the positive voltage +U1 is applied to all solid-state devices of the column. Upon interrogation with a 1, the transistor T1 is driven into saturation. Due to the interrogation voltage +U1, and depending on the state of the solid-state device, either a large or a small current will flow thru the resistor R. If the given information is in coincidence with the stored information, then a high-resistance will be in series with R, so that a low voltage drop will be across R. If the given information is not in coincidence with the stored information then a low-resistance will be in series with R, so that across R there will be a voltage drop which is high in comparison with the aforementioned voltage. When considering a whole row, a low voltage will be across the resistor R if with respect to all bits, the stored information is in coincidence with the given information. The voltage value is detected at each row in the evaluating circuit K. In this connection it should be pointed out that due to high switching ratio of the solid-state devices, which may be in the order of 1:$10^6$, and the case of greater word lengths, it is possible to distinguish between a non-coincidence and a complete coincidence.

If during the comparison one or more bits are not taken into consideration, then only the transistors T1 or T2 which are associated with the respective bit remain in the blocked condition. In this manner any arbitrary portion of a word can be marked.

After detection of one or more coincidences, there is effected sequentially the read-out of the information stored in the ascertained rows. In the row control H the transistor T7 is again driven into saturation, so that a current will flow via ground RG3, D1, F1, T7. A voltage will be across the resistor RG3 in case the device is low-resistive, and this voltage is applied to the result storage M.

In the case of large-scale memories (e.g. 1 million bit), the diode inverse currents, especially at high temperatures, can cause such a high voltage drop across R that a false indication is given. In order to avoid this, there is included the transistors T5, T6 which are indicated by dash lines in FIG. 2. The transistor T5, via its terminal P, is driven into saturation whenever transistor T1 is blocked, and vice versa. Thereby the diode inverse currents are redirected via T5 and, in the case of coincidence between the offered and the stored information at the most the collector-emitter voltage of T5 appears at the resistor R. If the solid-state devices, in the course of a single switching operation are not brought into the desired state, for example during the erase or the write-in operation, there may be included a coincidence circuit which is connected to the column leads, in which there is determined whether the stored information is in agreement or in coincidence with the offered information. Otherwise, the erase or the writing-in of a word is continued until a coincidence is achieved.

What is claimed is:

1. An associative memory matrix comprising:

a series connection of a diode and a solid state storage device at each crosspoint of said matrix, said storage device having a high resistive state as soon as a current exceeding a threshold value flows through the device, and the resistive state of said storage dedive indicating the storage condition at the crosspoint;

a row resistor in each row of said matrix and having one end coupled to a fixed reference potentail;

control means coupled to said matrix comprising column control means including first and second column transistors and first and second column resistors, and row control means including first and second row control transistors;

means for erasing a row including a voltage of one polarity selectively applied to said row by the collector-emitter section of said first row control transistor, and a reference potential series coupled to said first column resistor;

means for writing into a row including another voltage of said one polarity coupled to the emitter-collector path of said second row transistor to permit a series current to flow via said reference potential, said second resistor, said diode and storage device, and the emitter-collector path of said first column transistor;

means for interrogating including an interrogation voltage coupled to the emitter-collector path of said second column transistor, said interrogation voltage having an opposite polarity to said one polarity, whereby depending on the state of said storage device a large or small current will flow through said row resistor; and means for effecting read-out of one row including means for causing another series current to flow via said reference potential, said first resistor, said diode and storage device, and said second row transistor, whereby an output voltage is developed across said first column resistor when said storage device is in a low-resistive state.

2. The memory matrix according to claim 1 including means for redirecting a diode inverse current during interrogation, said means comprising a third column transistor whose emitter-collector path is coupled to said reference potential, and which is controlled in an opposite sense from said first column transistor.

References Cited

UNITED STATES PATENTS

| | | | |
|---|---|---|---|
| 3,014,203 | 12/1961 | Stevens | 340—173 |
| 3,201,764 | 8/1965 | Parker | 340—173 |
| 3,206,730 | 9/1965 | Igarashi | 340—173NR |
| 3,332,067 | 7/1967 | Bacon | 340—173NR |
| 3,334,336 | 8/1967 | Koerner | 340—173 |
| 3,388,386 | 6/1968 | Deutermann | 340—173 |
| 3,450,967 | 6/1969 | Tolutis | 340—173X |
| 3,397,325 | 8/1968 | Weimer | 340—173FF |
| 3,402,398 | 9/1968 | Koerner | 340—173AM |

TERRELL W. FEARS, Primary Examiner

U.S. Cl. X.R.

307—318